May 7, 1935.  T. A. GROVE  2,000,227
SCREW THREAD REPAIRING TOOL
Filed Oct. 4, 1934  2 Sheets-Sheet 1
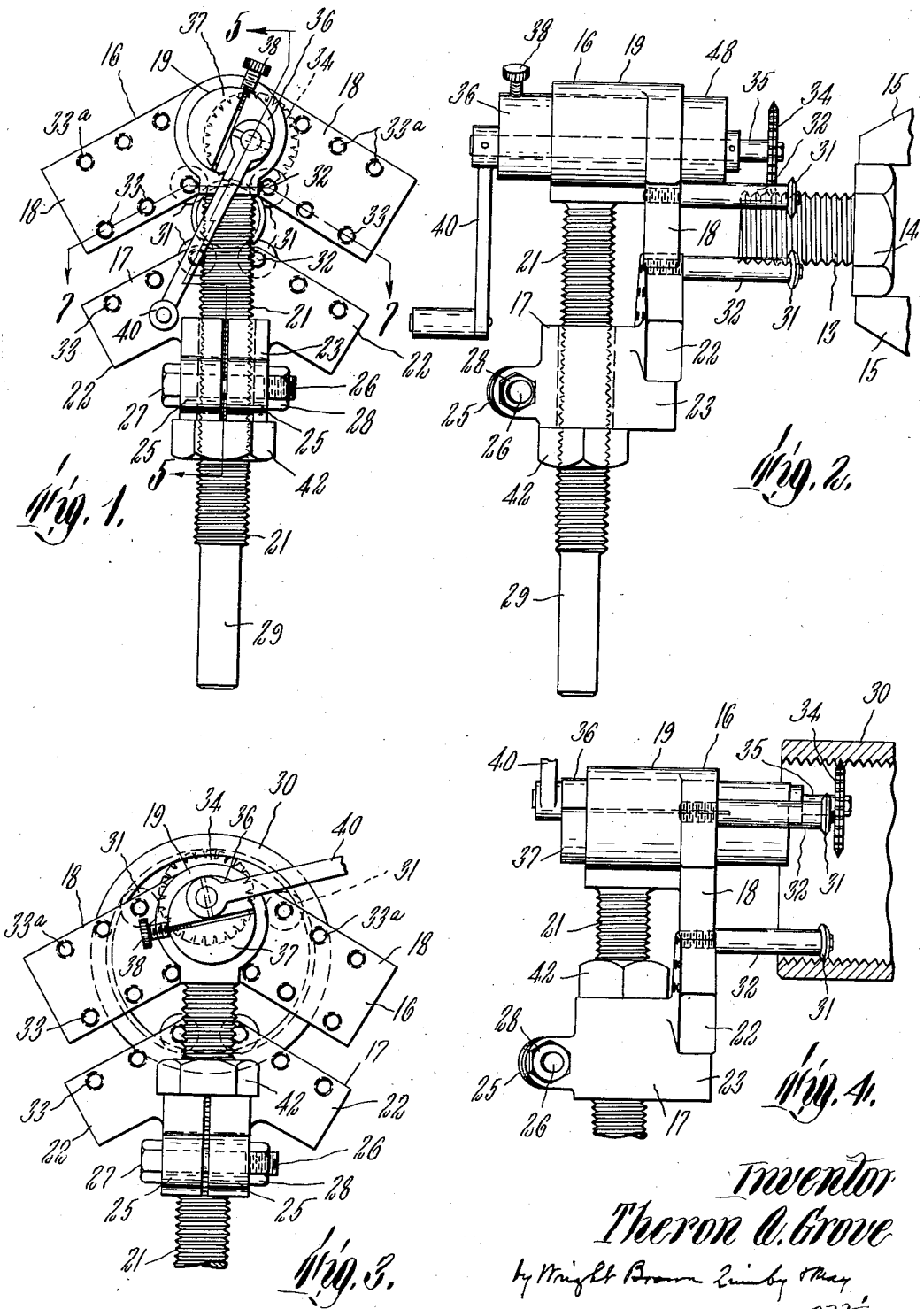
Inventor
Theron A. Grove
by Wright Brown Quimby & May
Attys.

May 7, 1935.  T. A. GROVE  2,000,227
SCREW THREAD REPAIRING TOOL
Filed Oct. 4, 1934   2 Sheets-Sheet 2
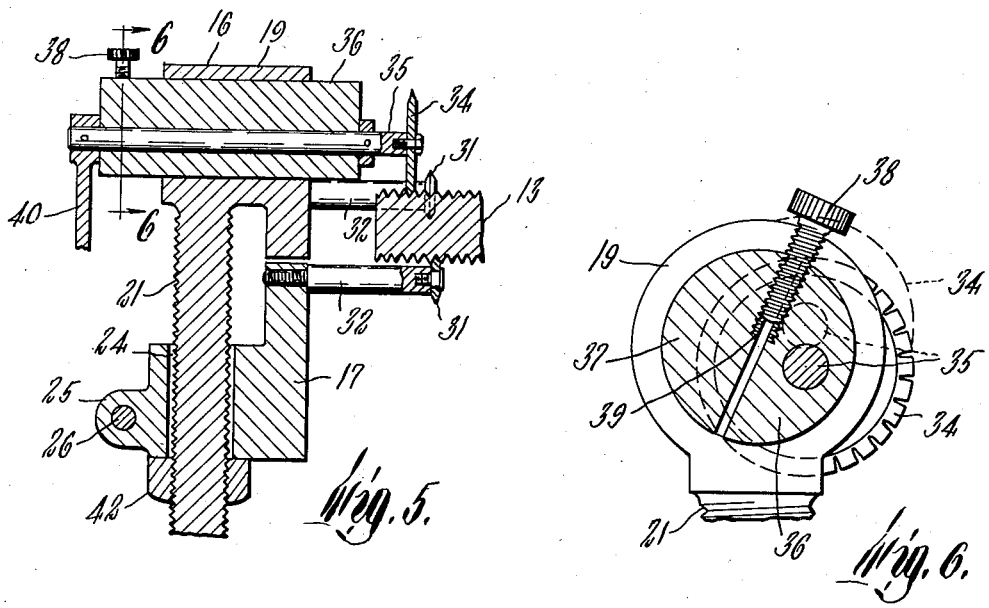
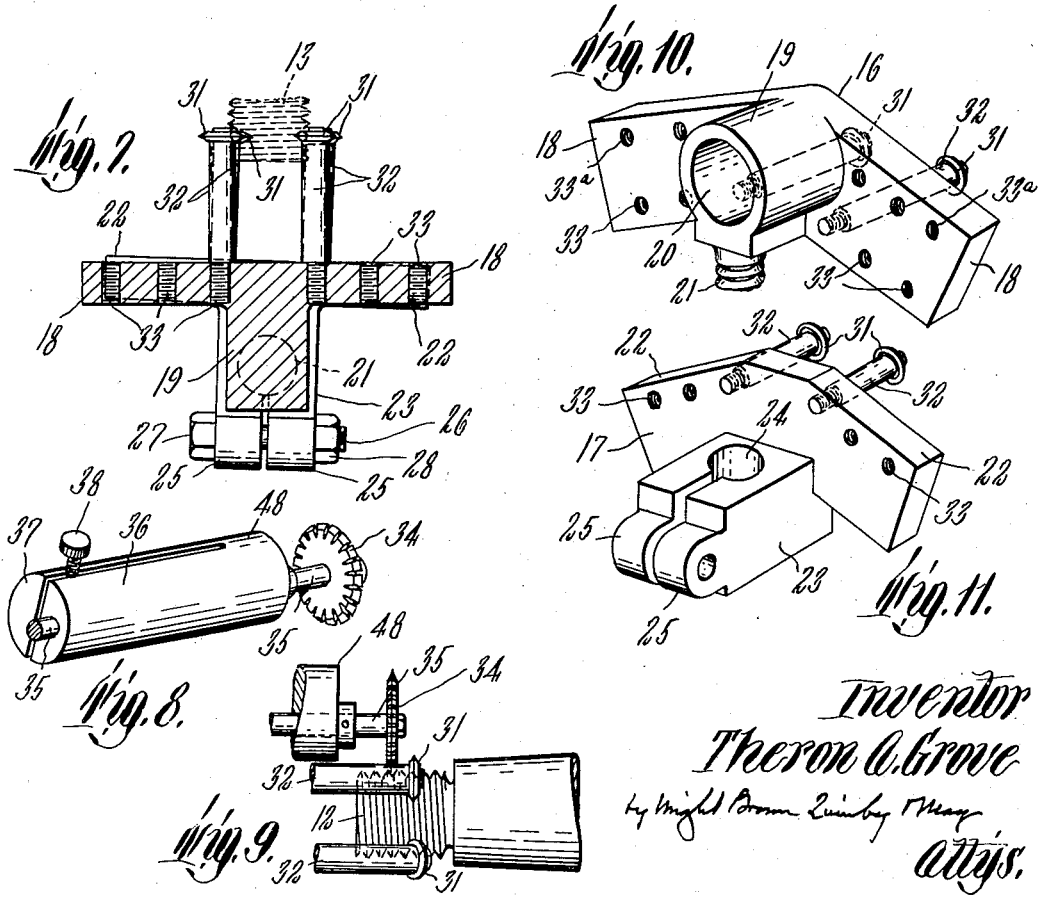
Inventor
Theron A. Grove
by Wright Brown Quinby May
attys.

Patented May 7, 1935

2,000,227

UNITED STATES PATENT OFFICE 2,000,227

SCREW THREAD REPAIRING TOOL

Theron A. Grove, Revere, Mass.

Application October 4, 1934, Serial No. 746,823

9 Claims. (Cl. 10—1)

One object of this invention is to provide a tool adapted to repair and render helically continuous external screw threads on bodies, such as motor vehicle axles or headed bolts, when such threads have been mutilated so that they are not at all points helically continuous and are so deformed or mutilated as to prevent nuts from being turned thereon, the tool being adapted for use in repairing threads of various diameters and having various numbers of convolutions per inch.

Another object is to provide a tool adapted to repair either external or internal screw threads of various diameters.

Of the accompanying drawings forming a part of this specification,—

Figure 1 is a front view of a tool embodying the invention, adjusted to repair external threads.

Figure 2 is a side view of the same.

Figure 3 is a view similar to Figure 1 showing the tool adjusted to repair internal threads.

Figure 4 is a view of the tool adjusted as shown by Figure 3.

Figure 5 is a section on line 5—5 of Figure 1.

Figure 6 is a section on line 6—6 of Figure 5.

Figure 7 is a section on line 7—7 of Figure 1.

Figure 8 shows in perspective the cutter hereinafter described, the cutter shaft, and the adjustable bearing whereby the cutter may be adjusted to enable it to act on threads of different diameters and pitch.

Figure 9 is a view similar to a portion of Figure 2, showing the cutter acting on the thread of a motor vehicle axle.

Figure 10 is a perspective view showing the inner head of the stock hereinafter described.

Figure 11 is a perspective view of the outer head of the stock.

The same reference characters indicate the same parts in all of the figures.

A screw thread repairing tool embodying the invention comprises a stock manually rotatable about the center of a screw threaded cylindrical body, which may be the outer end portion 12 of a motor vehicle axle (Figure 9), or a bolt 13 having a head 14 held by vise jaws 15, (Figure 2).

The stock includes an inner head 16 (Figure 10), and an outer head 17, (Figure 11), each head being preferably made as a casting in a single piece. The inner head 16 is preferably composed of inclined wing portions 18 extending oppositely from the center of the head, and inclined as shown by Figure 10, a socket portion 19 having a cylindrical bore 20, and a shank projecting downward from the socket 19, and provided with a threaded portion 21. The outer head 17 is preferably composed of inclined wing portions 22 extending oppositely from the center of the head and inclined as shown by Figure 11, and a split socket 23 having a split bore 24 in which the threaded portion 21 of the shank is loosely fitted, and ears 25 having holes to receive a bolt 26 whereby the bore may be compressed upon the threaded portion 21 of the shank, said bolt having a head 27 and a clamping nut 28. Provision is thus made for adjusting the heads so that the wing portions 18 of the inner head are slightly inclined or oblique in one direction relative to the axis of a bolt 13, or other threaded body on which the tool acts, and the wing portions 22 of the outer head are slightly inclined or oblique in the opposite direction as shown by Figure 7, the object of these inclinations being hereinafter stated.

The shank 21 has an extension providing a handle portion 29 whereby the stock may be manually rotated about an externally threaded body or within an internally threaded body, the tool being adjustable to permit the cutter and runners hereinafter described to act on either an externally threaded body as shown by Figures 2, 5 and 9, or on an internally threaded body 30, as shown by Figures 3 and 4.

The inner head 16 is provided with screw thread engaging means formed to enter and run in a screw thread and cause a lateral movement of the stock when the latter is rotated, said movement being governed by the pitch of the thread. Said means may be provided by runners 31 which are formed to enter the helical groove between the convolutions of a screw thread. Said runners are preferably small wheels journalled on studs 32 which are engaged with locating means, preferably tapped orifices 33 in the wing portions of the heads 16 and 17, the peripheries of the wheels being preferably knife-edged. Each head is provided with two spaced apart runners. The runners are shaped to conform to the inclination of the sides of the screw thread, and are so mounted on the studs that they cannot wobble, their peripheries being maintained at right angles with the studs. Said runners contact at spaced apart points with the helical thread and determine the angle which the stock heads 16 and 17 assume relative to the axis of the threaded body. The opposite inclination of the wing portions of the heads shown by Figure 7 enables the runners 31, carried by the inner head 16, to stand in planes which are inclined oppositely to the planes of the runners carried by the outer head 17 so that the runners are in alignment with screw threads of any pitch, and are adapted to accurately follow the thread convolutions. The runners may be fixed to the studs 32 instead of being adapted to rotate thereon.

The inner head 16 is provided with a rotary discoidal cutter 34 formed to enter the screw thread and repair or rectify mutilated portions of the sides thereof by cutting away such portions as may have been caused to project from the sides of the thread convolutions.

The cutter 34 is fixed to a shaft 35 which is journalled in a bearing supported by the inner head 16, said bearing being adjustable toward and from the axis of the threaded body to correspondingly adjust the cutter and enable it to act on bodies of different diameters.

The shaft 35 is so engaged with the inner head that the cutter is caused to move sidewise with the stock and travel progressively in a helical path in the screw thread when the stock is rotated.

The bearing of the cutter shaft 35 is formed in a semi-cylindrical block 36 which is located in the socket 19 of the inner head. Another semi-cylindrical block 37 is located in the socket beside the bearing block 36. Said blocks are connected at one end by a neck 48 (Figure 8), and are adapted to be turned in the socket for the purpose of adjusting the cutter shaft and cutter. An expanding device associated with the blocks 36 and 37 is adapted to force the blocks apart and bind their semi-cylindrical surfaces closely against the bore 20 of the socket to maintain the bearing block 36 in any adjusted position. Said device is preferably a screw 38, the threaded shank of which is slightly tapered and engaged with a divided tapped orifice 39 (Figure 6), formed in the blocks 36 and 37. When the screw is advanced into the orifice 39 it forces the blocks apart so that they are firmly secured. This adjusting means is adapted to be very quickly operated, only a slight turning of the screw 38 in one direction being required to permit the adjustment of the cutter shaft, and in the opposite direction to positively secure the shaft bearing in any adjusted position.

It will now be seen that when the stock is rotated about the axis of the threaded body, and the cutter shaft is rotated in its bearing, the cutter has a planetary movement in a helical path and follows the convolutions of the screw thread, the cutter moving in, and repairing the thread, preferably in advance of the runners. The cutter does not deviate from a helical path, and therefore does not follow any distortion or fault that there may be on a battered thread.

The cutter shaft may be manually rotated by a crank 40 fixed to its outer end. It is obvious, however, that the cutter may be driven by power communicated through a flexible shaft to the cutter shaft.

The threaded portion 21 of the stem is provided with a nut 42 which bears on the outer end of the split socket 23 and supports the outer head 17 at any distance from the inner head 16 that may be required by the diameter of an externally threaded body.

The description thus far relates particularly to the operation of repairing an external thread, the adjustment of the tool being as shown by Figures 1, 2, 5 and 7.

When an internal thread is to be repaired the adjustment is as shown by Figures 3 and 4. The nut 42 is adjusted to bear on the inner end of the split socket 23 and the studs 32 carrying the runners 31 associated with the inner head 16 are engaged with supplemental tapped orifices 33ᵃ in the wing portions 18 located near the outer edges of the wing portions 18, so that said runners are adapted to engage an internal thread at points rotatively remote from the points of engagement with said thread of the runners associated with the outer head 17.

I claim:

1. A screw thread repairing tool comprising a stock including an inner head having an elongated shank, and an outer head having shank-engaging means adjustable lengthwise of the shank to vary the distance between the heads and rotatively adjustable on the shank to locate the heads non-parallel with each other, said shank-engaging means being positively engageable with the shank to maintain any non-parallel location of the heads, the stock being manually rotatable relative to a screw threaded body, each head being provided with runner-locating means, and with runners formed to engage a screw thread and carried by studs engaged with said locating means, there being a pair of spaced apart runners on each head, the runners having a non-wobbling engagement with the studs, and a rotary cutter carried by the inner head and formed to rectify a mutilated screw thread engaged by the runners, the runners and cutter being moved in a helical path governed by the pitch of the screw thread when the stock is rotated, the rotating cutter having a planetary movement.

2. A screw thread repairing tool as specified by claim 1, the shank-engaging means of the outer head being embodied in a split socket fixed to said head, and provided with a split bore loosely fitting the shank, and with means for contracting said bore to cause it to bind on the shank and maintain the heads adjusted to non-parallel positions.

3. A screw thread repairing tool as specified by claim 1, the shank of the inner head being screw threaded and provided with a stop nut adapted to positively support the outer head at various distances from the inner head.

4. A screw thread repairing tool as specified by claim 1, a portion of the shank being extended to constitute a handle whereby the stock may be manually rotated.

5. A screw thread repairing tool as specified by claim 1, the runner locating means of said heads being tapped orifices, and the runner carrying studs being separably engageable with said orifices, there being a plurality of said orifices in each head permitting variable spacing of the runners.

6. A screw thread repairing tool as specified by claim 1, the runner locating means of said heads being tapped orifices, and the runner carrying studs being separably engageable with said orifices, there being a plurality of said orifices in each head permitting variable spacing of the runners, the inner head having a plurality of supplemental tapped orifices arranged to locate the runners carried by said head in position to engage an internal screw thread.

7. A screw thread repairing tool comprising a stock manually rotatable about a screw thread axis, said stock including an inner and an outer head and means adjustably connecting said heads, each of said heads being provided with thread-engaging means causing a lateral movement of the head lengthwise of a screw thread, said movement being governed by the pitch of the thread, the inner head being provided with a rotary cutter formed to enter the screw thread and repair mutilated portions thereof, means for rotating the cutter, and means for adjusting the cutter toward and from the center of a threaded body, and positively maintaining the cutter in any adjusted position, the cutter having a planetary movement in a helical path formed by the screw thread.

8. A screw thread repairing tool as specified by claim 7, said cutter being fixed to a shaft journalled in a bearing on the inner head, said bearing being formed in a portion of a cylindrical block located in an internally cylindrical socket on the inner head, another portion of said block being located in said socket beside and fixed to the bearing block portion, said block portions being adapted to be turned in the socket to adjust the shaft and cutter, an expanding device being associated with said socket and block portions adapted to force said portions apart and bind their semi-cylindrical surfaces against the internal surface of the socket to maintain the shaft and cutter in any adjusted position.

9. A screw thread repairing tool as specified by claim 7, said cutter being fixed to a shaft journalled in a bearing on the inner head, said bearing being formed in a semi-cylindrical block portion located in an internally cylindrical socket on the inner head, another semi-cylindrical block portion being located in said socket beside the bearing block portion and attached to the latter, said block portions being adapted to be turned in the socket to adjust the shaft and cutter, said block portions being provided with a split tapped orifice, and a tapered screw engaged with said orifice to force the block portions apart.

THERON A. GROVE.